United States Patent [19]

Maillet

[11] 4,197,006
[45] Apr. 8, 1980

[54] LASER TELEMETER

[75] Inventor: Henry Maillet, Sceaux, France

[73] Assignee: Compagnie Industrielle des Lasers, Marcoussis, France

[21] Appl. No.: 942,732

[22] Filed: Sep. 15, 1978

[30] Foreign Application Priority Data

Sep. 23, 1977 [FR] France ............................... 77 28705

[51] Int. Cl.² .................................................. G01C 3/08
[52] U.S. Cl. ............................................. 356/5; 356/4
[58] Field of Search ........................................ 356/4, 5

[56] References Cited

U.S. PATENT DOCUMENTS

| 3,834,795 | 9/1974 | Erickson et al. | 356/5 |
| 3,900,260 | 8/1975 | Wendt | 356/5 |
| 3,900,261 | 8/1975 | Wingate | 356/4 |
| 3,942,890 | 3/1976 | Malone | 356/5 |
| 3,951,549 | 4/1976 | Fowler et al. | 356/5 |

FOREIGN PATENT DOCUMENTS 468096  3/1969  Switzerland ............................... 350/266

Primary Examiner—S. C. Buczinski
Attorney, Agent, or Firm—Sughrue, Rothwell, Mion, Zinn and Macpeak

[57] ABSTRACT

The telemeter e.g. for tanks or aeroplanes, includes in particular a diaphragm disposed in the optical receiving system, the diaphragm is provided with closing means which operate outside the period during which a measuring echo is expected so as to protect the receiver of the telemeter against any interference light pulse (except during said measuring period). This reduces the risks of serious damage to the receiver from countermeasure laser pulses.

8 Claims, 4 Drawing Figures

LASER TELEMETER

FIELD OF THE INVENTION

The present invention relates to a laser telemeter and more particularly to a laser telemeter for military applications.

BACKGROUND OF THE INVENTION

There is known a laser telemeter which includes a laser generator suitable for sending a light pulse towards a target, a photoelectric receiver disposed to receive an echo of this pulse returned by the target and means for measuring the interval of time between the emission of the pulse sent by the generator and the return of the echo at the receiver. Receivers of telemeters of this type are generally semi-conductor components of small dimensions, e.g. avalanche diodes which can detect very low-power light pulses; but these components can be blinded temporarily or put out of action if they receive light engergy which is too powerful.

When such telemeters are installed on military equipment, it may happen that two telemeters fitted on equipment of opposing armies aim at each other. Then, if a laser pulse emitted by one of the telemeters enters the receiver system of the other, the receiver of the latter may in some conditions be damaged either temporarily or permanently. Further, a telemeter of one of the two armies may be subjected to systematic firing of countermeasure light pulses coming from telemeters or illuminators which belong to the enemy army. Finally, it appears that during a military operation between equipment equipped with telemeters of this type, there is an appreciable probability that some telemeters will thus be prematurely put out of action.

The present invention aims to mitigate this disadvantage and to produce a laser telemeter which is capable of withstanding systematic or accidental firing of counter-measure pulses.

SUMMARY OF THE INVENTION

The present invention provides a laser telemeter which includes:

a laser generator suitable for sending a laser ranging pulse towards a target situated at a range lying between a predetermined minimum range and a predetermined maximum range;

0 an optical receiving system disposed near the laser generator to receive an echo of the laser ranging pulse emitted by the generator and returned by a target and to concentrate the energy of the echo along an echo receiving axis;

a photoelectric receiver disposed on the path of the beam;

means for measuring the time interval lying between the sending of the pulse delivered by the generator and the return of the echo at the receiver; and controllable shutter means operating to prevent light which propagates towards the receiver along the receiving axis from reaching the receiver, at all times except for a laser ranging period extending from a first predetermined instant to after a second predetermined instant where the first predetermined instant is the instant when said receiver would receive an echo of its laser ranging pulse by reflection from a target situated at said minimum range and where the second predetermined instant is the instant when said receiver would receive an echo of its laser ranging pulse by reflection from a target situated at said maximum range.

The invention is described hereinbelow by way of example with reference to the accompanying drawings.

DESCRIPTION OF PREFERRED EMBODIMENTS

Figure 1:
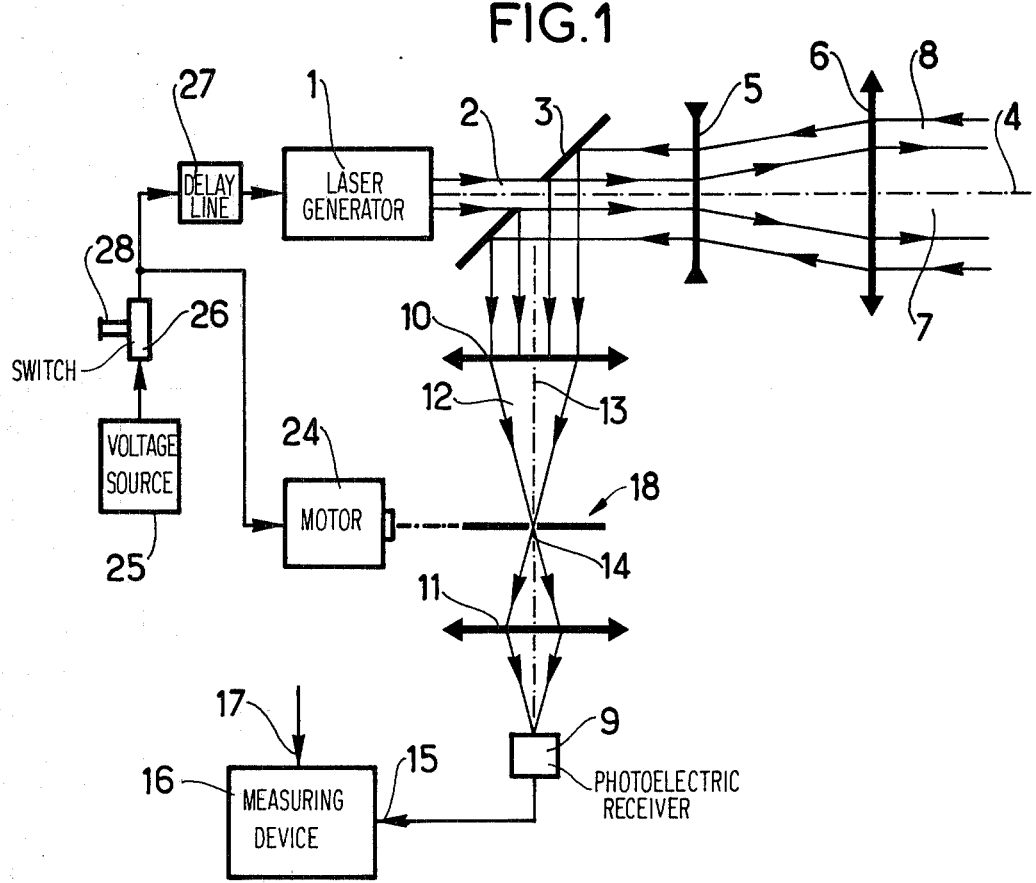
FIG. 1 shows schematically an embodiment of a telemeter in accordance with the invention.

In FIG. 1, a laser generator 1 delivers a light pulse constituted by a beam 2 which passes through a central opening of a mirror 3 inclined at 45° to the emission axis 4 of the generator 1. This pulse is then directed towards a target which is not shown in the figure, by an afocal optical system intended to increase the cross-section of the beam, the afocal system being constituted by a divergeing lens 5 and a converging lens 6. The light beam 7 which occupies an axial portion of the optical system is reflected by the target and the lens 6 receives at its periphery an echo 8 of the pulse which, after passing through the afocal optical system in the opposite direction and after being reflected by the mirror 3, is concentrated by an optical receiving system on a photoelectric receiver 9. The optical receiving system is constituted by two converging lenses 10 and 11 and the received beam 12 which propagates along the receiving axis 13 has a zone 14 of a minimum cross-section in between the lenses 10 and 11.

The receiver 9 is constituted by an avalanche diode whose electric output is connected to a first input 15 of a measuring device 16. A second input 17 of the measuring device 16 is connected to the electric output of another photoelectric receiver, not shown, which receives a small fraction of the light energy of the beam 2 shunted by means of a semi-reflecting plate which is also not shown.

Figure 2:
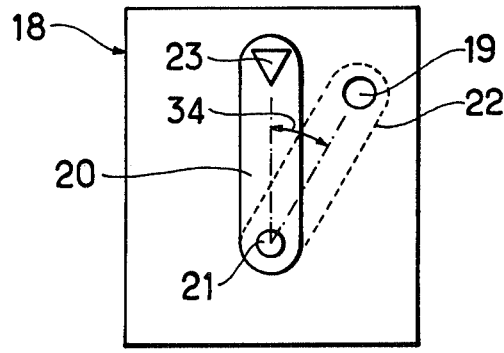
FIG. 2 is a plan view which shows in greater detail a component which forms a part of the telemeter illustrated in FIG. 1.

A diaphragm 18 of which FIG. 2 is a plan view is disposed in the zone 14 of the beam 12. This diaphragm has an orifice 19 centered on the axis 13 so as to surround the beam 12. A moving plate 20 is rotatably installed on a shaft 21 connected to the body of the diaphragm 18. In the position shown in continuous lines in FIG. 2, the plate 20 does not obstruct the orifice 19. In contrast, the orifice is obstructed when the plate 20 is in the position 22 shown in dotted lines in the figure. A retroreflective trihedron 23 with 3 reflecting surfaces which intersect at right-angles to form a trirectangular trihedron is fixed on the plate 20 substantially at the same distance from the shaft 21 as the orifice 19 of the diaphragm 18. The shaft 21 is coupled to the output shaft of a motor 24 fed by a voltage source 25 via a switch 26. The output of the switch 26 is also connected to the laser generator 1 via a delay line 27 so as to be able to trigger the pulse 2 by pressing the button 28 of the switch 26; this makes the voltage source 25 communicate with the laser generator 1.

The telemeter shown in FIG. 1 operates as follows.

When the botton 28 is pressed, firstly, the pulse 2 is triggered, then the moving plate 20 associated with the diaphragm 18 is moved.

Figure 4:
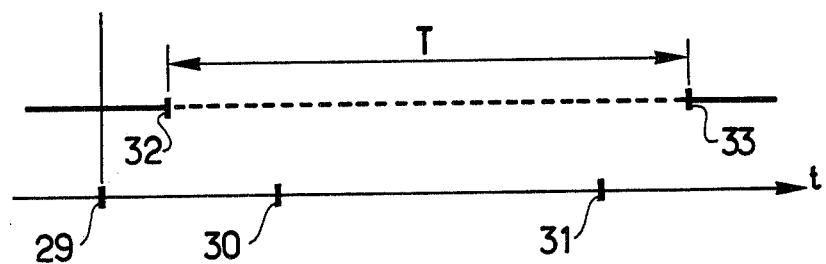
FIG. 4 is a diagram which explains the operation of the telemeters illustrated in FIGS. 1 and 3.

In the diagram in FIG. 4, time t is plotted along the lower horizontal line. The reference point 29 which corresponds to the instant when the botton 28 is pressed is marked on this line. The reference point 30 on this line is fixed at a distance from the reference point 29 which corresponds to the travel time of a laser pulse reflected from a hypothetical target placed at a minimum measuring distance "d" of the telemeter. Although this distance "d" can theoretically be equal to zero, it is preferred in practice to fix it at a value greater than zero to eliminate interference point from retrodiffusion echoes. Likewise, a reference 31 is placed on the time axis t and corresponds to the travel time of a pulse reflected from a hypothetical target at a maximum range D of the telemeter.

Two reference points 32 and 33 which are such that the section 32–33 completely coveres the segment 30–31 are shown on the same time scale on an upper horizontal line. These reference points 32 and 33 correspond respectively to the opening and closing instants of the orifice 19 of the diaphragm 18. This opening and this closing are caused by the action of the motor 24 which is a special type of motor: it rotates in one direction through a predetermined angle when it is energized and then rotates in the opposite direction through the same angle after a predetermined time T. The predetermined rotation angle of the motor 24 is equal to the angle 34, FIG. 2, formed between the two positions 20 and 22 of the shutter plate installed on the diaphragm 18.

Originally the plate occupies position 22 and closes the orifice 19. Pressing the button 28 at the instant represented at the reference point 29 opens the orifice 19 at the instant represented by the reference point 32 after a time equal to the response time of the motor. The orifice 19 closes again at the instant represented by the reference point 33, the reference point 32 and 33 being separated by the time interval T. Since the response time of the motor may be long in relation to the laser pulse triggering time, a delay line 27 can be inserted, as in this case, between the switch 26 and the laser 1 to prevent the emission of a laser pulse whose echo would reach the receiver 9 before the instant 30.

It is seen that the telemeter illustrated in FIG. 1 prevents any light which is propagating towards the receiver 9 along the axis 13 from reaching the receiver before the instant defined by the reference point 32 and after the instant defined by the reference point 33, these reference points 32 and 33 being fixed so as to encompass the predetermined time interval 30–31. Thus, all light coming from an adverse emission of systematic or accidental counter-measure light pulses is blocked by the plate 20 outside the time interval 30–31 when the orifice of the diaphragm 18 must be open to allow the echo of the measuring pulse returned by the target to pass. The time interval which corresponds to the travel time of the measuring pulse reflected by the target is measured by the device 16 which enables the distance from the target to be displayed in a known manner.

The retroreflective trihedron 23 which can be fixed on the plate 20 returns the counter-measure light pulses via the optical system towards the adversary's telemeter or the adverse illuminator which emitted them. Indeed, it is known that these trihedrons have the property of returning all light in a direction strictly identical to the incident direction. It may thus succeed in damaging the receiver of the adversary's telemeter.

Figure 3:
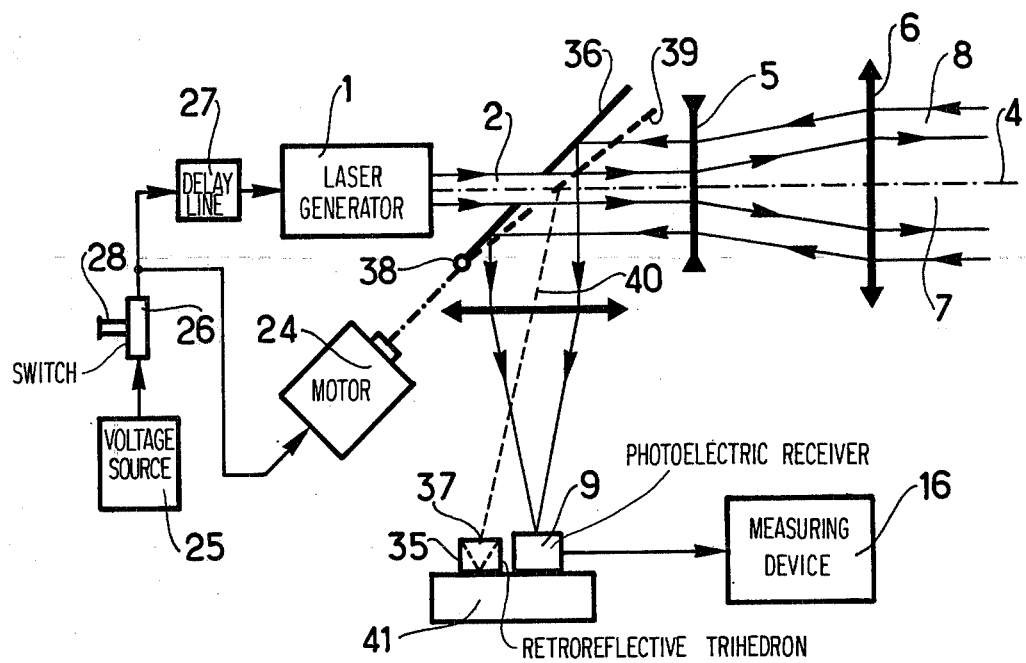
FIG. 3 shows a second embodiment of the telemeter in accordance with the invention.

FIG. 3 shows another embodiment of the telemeter in accordance with the invention and which comprises numerous components identical to those in FIG. 1 which bear the same references. The telemeter comprises a reflecting mirror 36 analogous to the mirror 3 in FIG. 1, but which can be rotated through a predetermined angle on a shaft 38 perpendicular to the plane of the figure. After rotation, the mirror occupies the position 39 (shown in discontinuous lines) so as to divert the received beam along an axis 40. This beam is then concentrated at a point 37 situated beside the receiver 9 and a retroreflective trihedron 35 can be disposed at the point 37 to return the counter-measure light pulses to the adversary's telemeter or illuminator. The trihedron 35 and the receiver 9 can be fixed on a base 41. The motor 24 operates in the same way as that of the telemeter illustrated in FIG. 1. Therefore, after a predetermined time T, the mirror 36 which occupies the position 39 is returned to its original position. The operation of this telemeter is analogous to that shown in FIG. 1.

The telemeter described hereinabove and illustrated in FIGS. 1 and 3 make it possible to intercept any systematic or accidental counter-measure light pulses outside the time strictly reserved for receiving measuring echoes. This results in a great reduction of the probability of premature destruction of the receivers of these apparatuses during military operations.

Laser telemeters in accordance with the invention can be applied to equipping tanks and aircraft.

Of course, the present invention is in no way limited to the embodiments described or illustrated, which have been given only by way of examples. In particular, without going beyond the scope of the invention, some means can be replaced by equivalent means. Thus, the oscillating motor 24 can be replaced by an electromagnet whose plunger core controls the movement of the plate 20 or of the mirror 36. This plunger core can be returned to its original position after controlling the opening of the orifice 19 or the movement of the mirror 36 by a return spring which operates as soon as the electromagnet is no longer energized. In this case, the voltage source 25 supplies a voltage gating pulse which has a predetermined duration so that the plate 20 or the mirror 36 will be returned to their original position after the time T.

I claim:

1. A laser telemeter comprising:
   a laser generator for sending a laser ranging pulse towards a target situated at a range lying between a predetermined minimum range and a predetermined maximum range;
   an optical receiving system disposed near the laser generator to receive an echo of the laser ranging pulse emitted by the generator and returned by a target and to concentrate the energy of the echo along an echo receiving axis;
   a photoelectric receiver disposed on the path of the beam;
   means for measuring the time interval between the sending of the pulse delivered by the generator and the return of the echo at the receiver; and
   controllable shutter means for preventing light which propagates towards the receiver along the receiving axis from reaching the receiver, at all times except for a laser ranging period extending from a first predetermined instant to after a second predetermined instant where the first predetermined instant is the instant when said receiver would receive an echo of its laser ranging pulse by reflection from a target situated at said minimum range and where the second predetermined instant is the instant when said receiver would receive an echo of its laser ranging pulse by reflection from a target situated at said maximum range, and wherein the laser generator further includes a switch control means for triggering the pulse, the optical system includes a mirror for reflecting the received beam, and the controllable shutter means comprises means controlled by said operation of said switch, to successively:

rotate the reflecting mirror through a predetermined angle to divert the received beam away from the receiver; and reset the mirror in its original position.

2. A laser telemeter according to claim 1, further including a retroreflective trihedron fixed beside the receiver so as to receive and return the received beam when it is diverted from the receiver.

3. A laser telemeter according to claim 2, wherein the means for triggering the pulse include a delay line for delaying the triggering of the pulse by a predetermined time.

4. A laser telemeter according to claim 1, wherein the means for triggering the pulse include a delay line for delaying the triggering of the pulse by a predetermined time.

5. A laser telemeter comprising:

a laser generator for sending a laser ranging pulse towards a target situated at a range lying between a predetermined minimum range and a predetermined maximum range;

an optical receiving system disposed near the laser generator to receive an echo of the laser ranging pulse emitted by the generator and returned by a target and to concentrate the energy of the echo along an echo receiving axis;

a photoelectric receiver disposed on the path of the beam;

means for measuring the time interval between the sending of the pulse delivered by the generator and the return of the echo at the receiver; and controllable shutter means for preventing light which propagates towards the receiver along the receiving axis from reaching the receiver, at all times except for a laser ranging period extending from a first predetermined instant to after a second predetermined instant where the first predetermined instant is the instant when said receiver would receive an echo of its laser ranging pulse by reflection from a target situated at said minimum range and where the second predetermined instant is the instant when said receiver would receive an echo of its laser ranging pulse by reflection from a target situated at said maximum range, and wherein the laser generator further includes a switch control means for triggering the pulse, the optical system includes a mirror for reflecting the received beam, and the controllable shutter means comprises means controlled by said operation of said switch, to successively:

rotate the reflecting mirror through a predetermined angle to divert the received beam away from the receiver; and reset the mirror in its original position, said laser generator further including controlled means for triggering the pulse, and wherein the controllable shutter means comprises:

a diaphragm having an orifice centered on the echo receiving axis of a moving shutter plate for the orifice; and means for controlling the movement of the shutter plate by operation of the said switch so as to open and close said orifice successively, and a retroreflective trihedron fixed on the shutter plate so as to return the light which propagates towards the receiver along the receiving axis back along said axis when the orifice of the diaphragm is closed by the shutter plate.

6. A laser telemeter according to claim 5, wherein the orifice of the diaphragm is placed in a minimum cross-section zone of the received beam.

7. A laser telemeter according to claim 5, wherein the means for triggering the pulse include a delay line for delaying the triggering of the pulse by a predetermined time.

8. A laser telemeter comprising:

a laser generator for sending a laser ranging pulse towards a target situated at a range lying between a predetermined minimum range and a predetermined maximum range;

an optical receiving system disposed near the laser generator to receive an echo of the laser ranging pulse emitted by the generator and returned by a target and to concentrate the energy of the echo along an echo receiving axis;

a photoelectric receiver disposed on the path of the beam;

means for measuring the time interval between the sending of the pulse delivered by the generator and the return of the echo at the receiver; and controllable shutter means for preventing light which propagates towards the receiver along the receiving axis from reaching the receiver, at all times except for a laser ranging period extending from a first predetermined instant to after a second predetermined instant where the first predetermined instant is the instant when said receiver would receive an echo of its laser ranging pulse by reflection from a target situated at said minimum range and where the second predetermined instant is the instant when said receiver would receive an echo of its laser ranging pulse by reflection from a target situated at said maximum range, and wherein the laser generator further includes a switch control means for triggering the pulse, and wherein the controllable shutter means comprises a diaphragm having an orifice centered on the echo receiving axis of a moving shutter plate for the orifice; and means for controlling the movement of the shutter plate by operation of said switch so as to open and close said orifice successively, said orifice of the diaphragm being placed in a minimum cross-section zone of the received beam, and said means for triggering the pulse including a delay line for delaying the triggering of the pulse by a predetermined time.

* * * * *